(12) United States Patent
Jeffers et al.

(10) Patent No.: US 12,473,221 B2
(45) Date of Patent: Nov. 18, 2025

(54) WATER REMEDIATION

(71) Applicants: CHAMPIONX CANADA ULC, Fort St. John (CA); REFRESH RESOURCES LTD., Fort St. John (CA)

(72) Inventors: David Sean Jeffers, Rose Prairie (CA); Arlee Frederick McRae, Fort St. John (CA)

( * ) Notice: Subject to any disclaimer, the term of this patent is extended or adjusted under 35 U.S.C. 154(b) by 427 days.

(21) Appl. No.: 18/061,175

(22) Filed: Dec. 2, 2022

(65) Prior Publication Data

US 2023/0174404 A1 Jun. 8, 2023

Related U.S. Application Data

(60) Provisional application No. 63/285,955, filed on Dec. 3, 2021.

(51) Int. Cl.

| | | |
|---|---|---|
| *C02F 1/24* | (2023.01) | |
| *C02F 1/34* | (2023.01) | |
| *C02F 1/40* | (2023.01) | |
| *C02F 1/52* | (2023.01) | |
| *C02F 1/56* | (2023.01) | |
| *C02F 9/00* | (2023.01) | |

(52) U.S. Cl.
CPC .............. *C02F 9/00* (2013.01); *C02F 1/24* (2013.01); *C02F 1/34* (2013.01); *C02F 1/40* (2013.01); *C02F 1/5245* (2013.01); *C02F 1/56* (2013.01); *C02F 2201/002* (2013.01)

(58) Field of Classification Search
CPC ...... C02F 9/00; C02F 1/24; C02F 1/34; C02F 1/40; C02F 1/5245; C02F 1/56; C02F 2201/002; C02F 1/52; C02F 1/5227; C02F 1/5272; C02F 1/54; B01D 21/0084; B01D 21/0087; B01D 21/01; B01D 21/08; B01D 21/24; B01D 21/2433; B01D 21/28; E02B 15/04; E02B 15/06; E02B 15/08; E02B 15/10; E02B 15/106; E02B 15/107

See application file for complete search history.

(56) References Cited

U.S. PATENT DOCUMENTS

| | | | | |
|---|---|---|---|---|
| 1,887,941 A | * | 11/1932 | Moore | C10G 50/00 |
| | | | | 208/261 |
| 3,779,385 A | * | 12/1973 | Strohecker | E03F 5/16 |
| | | | | 405/63 |
| 5,071,286 A | * | 12/1991 | Separovich | E02B 15/0885 |
| | | | | 405/72 |
| 5,413,719 A | * | 5/1995 | Sivakumar | G01N 33/18 |
| | | | | 210/708 |

(Continued)

FOREIGN PATENT DOCUMENTS

| | | | | |
|---|---|---|---|---|
| CA | 2731608 A1 | * | 1/2010 | ................ C02F 1/56 |
| CA | 2953591 A1 | * | 7/2018 | |

(Continued)

OTHER PUBLICATIONS

U.S. Appl. No. 63/285,955, filed Dec. 3, 2021,.

*Primary Examiner* — Joseph W Drodge

(57) ABSTRACT

Embodiments of the invention relate to removing suspended and solids from water using coagulating chemicals to coagulate the solids and hydrocarbon components to float the coagulated solids and where the same are removed from a water reservoir by mechanical means such as skimming.

18 Claims, 6 Drawing Sheets

(56) References Cited

U.S. PATENT DOCUMENTS

| | | | | |
|---|---|---|---|---|
| 5,730,882 A | * | 3/1998 | Gallup | B01D 17/041 |
| | | | | 210/708 |
| 2011/0017677 A1 | * | 1/2011 | Evans | C02F 1/5236 |
| | | | | 210/708 |
| 2011/0147316 A1 | | 6/2011 | Polizzotti et al. | |
| 2014/0231084 A1 | * | 8/2014 | Varadaraj | E21B 21/066 |
| | | | | 166/278 |
| 2016/0367912 A1 | * | 12/2016 | Kennedy | C02F 1/008 |
| 2017/0144906 A1 | * | 5/2017 | Andrews | C02F 1/5245 |
| 2021/0246053 A1 | * | 8/2021 | Kleinguetl | C02F 1/52 |

FOREIGN PATENT DOCUMENTS

| | | | |
|---|---|---|---|
| WO | 2010011867 A1 | 1/2010 | |
| WO | 2014209318 A1 | 12/2014 | |
| WO | 2015032007 A1 | 3/2015 | |

* cited by examiner

WATER REMEDIATION

CROSS-REFERENCE TO RELATED APPLICATIONS

This application claims priority to U.S. Provisional Patent Application No. 63/285,955 filed on 3 Dec. 2021, the disclosure of which is incorporated herein, in its entirety, by this reference.

BACKGROUND

Many industrial processes utilize water for various purposes, such as cooling, lubrication, pressure formation, debris clearance, etc., such as for drilling, fracking, cleaning or the like. However, some water includes components that are not desirable, such as metals, organic debris (e.g., leaves), bacteria, dirt, clay, or any other solid material. Such undesirable materials are often present in produced water. Such undesirable materials can foul, create sludges, and/or contaminate water tables and fresh water sources.

Water stored in holding ponds, tanks, or the like can become overburdened with solids or sludges through settling or precipitation of minerals, contamination from leaves or organics that contribute to solids/sludge on the pond bottom or suspended in the water. These solids contaminate the water and reduce the volume of water available for reuse or disposal, thereby lowering the utility and value of the water stored in the holding ponds or tanks. Traditional clean-up of these solids, such as settling or increases the health hazards and costs associated with manpower and equipment. Therefore a solution is needed to improve the usage of and cleaning process by which these undesirable solids may be removed from water and/or produced water.

SUMMARY

Embodiments of the invention relate to solids removal in a water reservoir by floating solids to the surface and removing the solids at or near the surface.

In an example embodiment, a method of cleaning water is disclosed. The method includes suspending solids in water in a water reservoir. The method includes emulsifying the solids with one or more coagulant chemicals and one or more hydrocarbon components to form an emulsion. The method includes floating the solids to an upper surface region of the water reservoir by bonding the hydrocarbon components to the solids and coagulating the hydrocarbon components and solids to form a slurry of suspended solids.

In an additional embodiment, a system for cleaning water is disclosed. The system includes a water reservoir. The system includes at least one high velocity pump fluidly connected to the water reservoir. The system includes a coagulant chemical source fluidly connected to the high velocity pump. The system includes a hydrocarbon component source fluidly connected to the high velocity pump. The system includes one or more collection apparatuses fluidly connected to the water reservoir.

In an additional embodiment, a method of cleaning produced water is disclosed. The method includes agitating water in a water reservoir to suspend solids therein. The method includes forming an emulsion by circulating one or more coagulant chemicals, one or more hydrocarbon components, the water, and the solids through at least one high velocity pump. The method includes floating the solids, hydrocarbon components, and one or more coagulant chemicals in the water reservoir as a slurry of suspended solids. The method includes removing the slurry of suspended solids from the water reservoir.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to solids removal in water by floating solids to the surface and removing the solids at or near the surface. The techniques and systems disclosed herein generate an emulsion through shear forces and chemistry to float the solids in water to the surface of a water reservoir for removal. For example, the techniques and systems disclosed herein agitate solids in a water reservoir to temporarily suspend the solids, emulsify hydrocarbon components and coagulant chemical(s) with the water and solids to attach to the solids, allow the coagulant chemicals to coagulate the hydrocarbons and solids as they float upwards to form a slurry of suspended solids at the surface region of the water reservoir, and remove the slurry of suspended solids floating in the water. Such techniques and systems are highly useful in removing solids from wastewater, produced water, cooling water, drilling water, mining water, or the like.

Water remediation systems for cleaning (solids from) water include a water reservoir, at least one high velocity pump, a coagulant chemical source coupled to the high velocity pump, a hydrocarbon component source coupled to the high velocity pump, and one or more collection apparatuses. The high velocity pump includes an inlet conduit and an outlet conduit disposed in the water reservoir to remove and input fluid therein. Coagulant chemicals and hydrocarbon components are added to the water and emulsified with the solids in the water at the high velocity pump.

Figure 1:
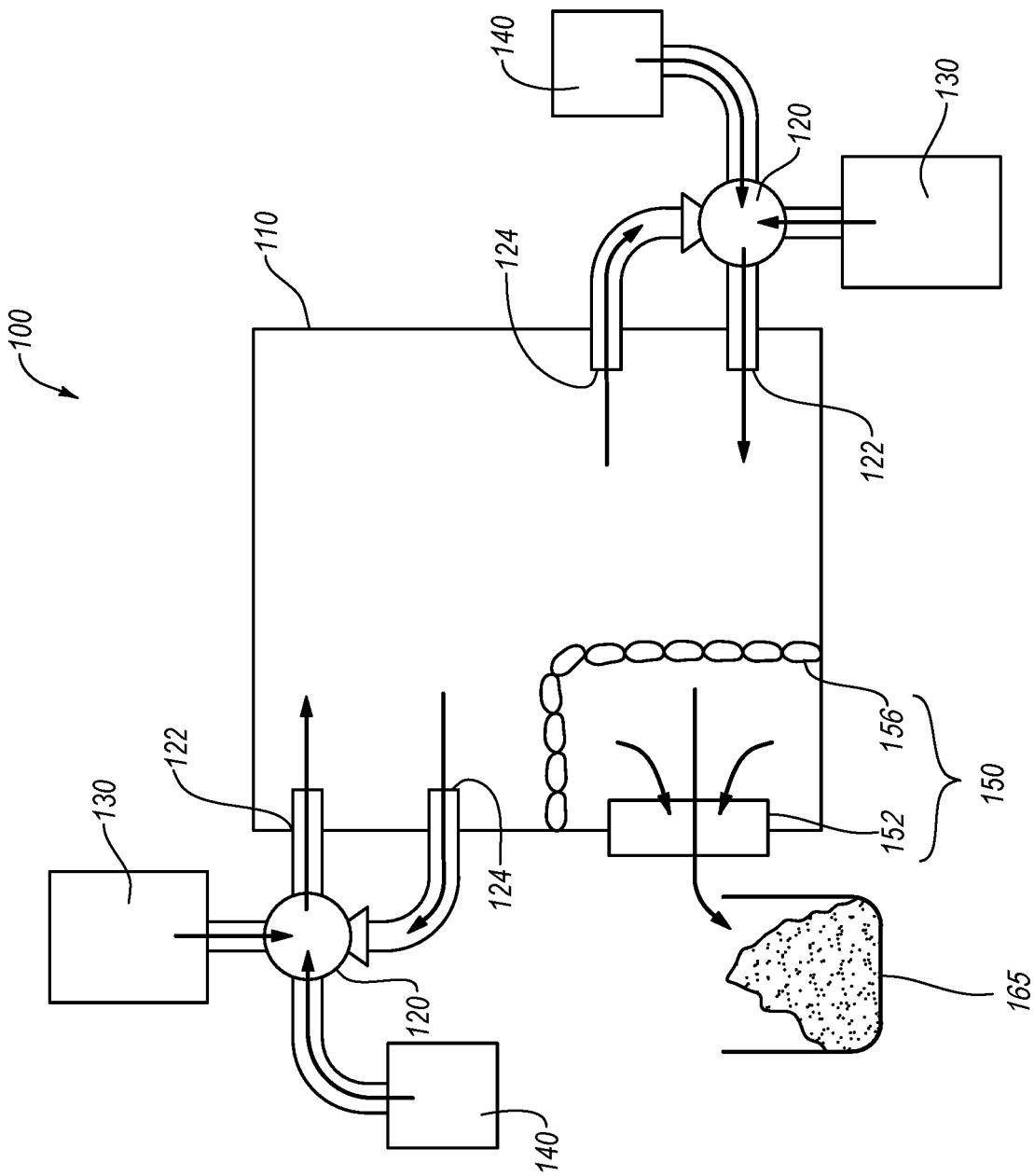
FIG. 1 is a block diagram of a system for cleaning water, according to an embodiment.

FIG. 1 is a block diagram of a system 100 for cleaning water, according to an embodiment. The system 100 may be used to clean solids from a water reservoir. The system 100 includes water reservoir 110, at least one high velocity pump 120 fluidly connected to the water reservoir 110, a coagulant chemical source 130 fluidly connected to the high velocity pump 120, a hydrocarbon component source 140 fluidly connected to the high velocity pump 120, and one or more collection apparatuses 150. The system 100 may include at least one suspended solids storage tank 165.

The water reservoir 110 may include a holding pond, tank, or the like. The water reservoir 110 may include a liner or other reservoir material defining a volume of the water reservoir 110 for containing the water therein. The liner or other reservoir material is waterproof to retain the water therein. For example, suitable liners or reservoir material may include a polymer liners (e.g., polyvinyl chloride, high density polyethylene, low density polyethylene, reinforced polyethylene), a rubber liner, or the like. A liner may be disposed in a pit, depression, or excavated area of earth to form a holding pond.

The water in the water reservoir 110 may contain one or more solids disposed therein. The solids may include metals (e.g., Fe, Ba, Ca, CaSO, or the like in ionic, salt, or other forms), organic material (e.g., leaves, grass, sludge, and organic debris that falls or blows naturally into ponds), bacteria, dirt, clay, formation fines, fracturing sand, or the like. The solids may act as emulsifying agents when agitated in the water. The solid is present as unwanted waste in the water but can be removed using the systems and techniques disclosed herein. The water reservoir 110 may be coupled to a source of water having solids therein, such as a wastewater outlet, produced water outlet, cooling water outlet, fracking water outlet, drilling water outlet, mining water outlet, municipal water outlet, or the like. The water and solids are contained in the water reservoir 110.

The system 100 includes at least one high velocity pump fluidly connected to the water reservoir 110. For example, the at least on high velocity pump 120 may be fluidly connected to the water in the water reservoir 110 via an outlet 122 and an inlet 124. The outlet 122 may include a conduit (e.g., pipe, tubing, hose, or the like) disposed in the water reservoir 110. Likewise, the inlet 124 may include a conduit disposed in the water reservoir 110. The at least one high velocity pump 120 intakes water from the water reservoir 110 through the inlet 124 and outputs the water (and emulsified solids, coagulant chemicals, and hydrocarbon components) through the outlet 122.

The inlet 124 may be constructed and disposed in the water reservoir 110 reach a selected point in the water reservoir 110 (e.g., the bottom of the water reservoir 110). The at least one high velocity pump 120 may include an outlet 122 configured as a conduit sized, shaped, and positioned, to output the emulsion of water, coagulant chemical(s), hydrocarbon component(s), and solids (e.g., emulsifying agents) at a selected point in the water reservoir 110, such as to provide circulation or a current in the water reservoir 110. The outlet 122 and the inlet 124 may be positioned to create turbulence in the water in the water reservoir 110 to stir up and/or suspend solids therein. For example, settled solids may be temporarily suspended in the water in the water reservoir 110 after agitation.

The high velocity pump 120 provides enough shear force to form a substantially uniform emulsion of water, coagulant chemical(s), hydrocarbon component(s), and solids. The high velocity pump 120 may include at least a 2 inch pump, such as a 4 inch, 6 inch, 8 inch, 10 inch, or less than a 10 inch pump. The size of the high velocity pump 120 is defined by the a discharge outlet of the pump. Suitable high velocity pumps may include one or more of a mass transfer pump, a rotary pump, a turbine pump, or the like. The high velocity pump 120 may be configured to circulate water, solids, coagulant chemicals, and hydrocarbon components therethrough at rate selected to provide high enough shear forces to emulsify the components in a substantially uniform emulsion. A "substantially uniform emulsion" is a heterogeneous mixture of water, solids, coagulant chemicals, and hydrocarbon components that is at least 90% homogenous (e.g., having the same proportions of materials therein) in each discrete volume of the water reservoir. Notwithstanding that the solids (and one or more solid coagulation chemicals) are present (e.g., suspended) in the emulsions disclosed herein, for simplicity, these solids are considered part of the emulsions. The emulsions disclosed herein include water in oil emulsions. It should be understood that the liquid components of the emulsion act on the solids suspended therein to form a slurry of suspended solids. The rate of fluid through each high velocity pump 120 may be at least 100 gallons per minute (gpm), such as 1000 gpm to 4000 gpm, 1000 gpm to 2000 gpm, 2000 gpm to 3000 gpm, 3000 gpm to 4000 gpm, less than 4000 gpm, or less than 3000 gpm. For example, a high velocity rotary pump maybe configured to circulate up to 3700 gpm through an 8 inch discharge outlet.

To form a substantially uniform emulsion of water, solids, coagulant chemicals, and hydrocarbon components, the inventors have found that a flow of 1600 gpm through a 6 inch pump, or a flow of 3700 gpm through a multiport pump with two 8 inch outlets and one 6 inch outlet is sufficient to generate the shear forces necessary. Such pumps are considered "high velocity pumps" for the purposes herein. It is expected that proportionally similar flow rates and pump size combinations to those mentioned above can be used to form a substantially uniform emulsion. Variance from the flow rates and pump sizes can be utilized so long as the volume of the water reservoir is able to be cycled through the one or more high velocity pumps in a 12 hour period. In order to form a substantially uniform emulsion of water, solids, coagulant chemicals, and hydrocarbon components, the size of the pump may be reduced if the rate of water through the high velocity pump 120 is reduced.

Suitable high velocity pumps 120 may include a Cornell 6 inch water transfer pump (from CORNELL PUMP COMPANY of Clackamas, Oregon, USA) configured to transfer 1600 gpm (6 m$^3$/min) at 1800 rpms, a Cornell model 8NHTA-EM18DB-1 multi-discharge output water transfer pump (from CORNELL PUMP COMPANY) with two 8 inch outlets and one 6 inch outlet configured to transfer 3700 gpm (14 m$^3$/min) at 1800 rpm, or the like.

The at least one high velocity pump 120 is fluidly connected to the coagulant chemical source 130 and the hydrocarbon component source 140, such as through one or more conduits. Coagulant chemicals may be added to and emulsified with the solids and water circulating through the high velocity pump 120 from the coagulant chemical source 130 and hydrocarbon components may be added to and emulsified with the solids and water circulating through the high velocity pump 120 from the hydrocarbon component source 140.

The coagulant chemical(s) source 130 may include a reservoir containing coagulant chemical(s) (described in detail below). The coagulant chemical source 130 may include a tank, barrel, container, or other reservoir configured to hold coagulant chemicals therein. For example, the coagulant chemical source 130 may include a polymer tank of coagulant chemicals.

The coagulant chemical(s) source 130 may be fluidly connected to the high velocity pump 120 via one or more of a conduit or pump (not shown) therebetween, such as a metering pump to control the rate or amount of coagulant chemicals added to the water and solids passing through the high velocity pump 120. A spool may be utilized between the high velocity pump 120 and the coagulant chemical(s) source 130 to aid in mixing the coagulant chemical(s) with the water and solids therein.

The coagulant chemicals in the coagulant chemical source 130 may include one or more coagulant chemicals therein. The coagulant chemicals are formulated to promote coagulation of solids in the water in the water reservoir 110. Coagulant chemicals may include a solvent, organic coagulants, inorganic coagulants, or combinations of any of the foregoing. For example, organic coagulants may include polyamines, polyquaternary amine halides (e.g., dimethylamine-epichlorohydrin copolymer), dithiocarbamates, tannins, poly(diallyldimethyl)ammonium chloride (pDADMAC), co and terpolymers of diallyldimethylammonium chloride with one or more of acrylamide, methacrylamide, acrylic acid, methyacrylic acid, dialkylaminoethylacrylate (chloride quat), methacylamidopropyltrimethylammonium chloride and 2-acrylamido-2-methyl-1-propane sulfonic acid. Organic coagulants may include condensation polymers of dimethylamine/epichlorohydrin (epi-DMA), Triethanolamine quat (TEA quats) polymers, and ethylene dichloride/ammonia polymers (EDC-ammonia). The organic coagulant chemicals are usually cationic, but can be also be anionic. Molecular weights of the organic coagulants can range from 10000 to 1 million amu, but generally 20000-500000 amu. The organic coagulants may be utilized with water as a solvent (e.g., water-based).

Coagulants usually have a high charge density. Because of this, they act as charge neutralizers when they interact with oppositely charged particles. Water clarification is not necessarily based on charge, but includes the development of the metal hydroxide that help precipitate and clarify suspended solids.

Inorganic coagulant chemical(s) may include aluminum salts (e.g., aluminum hydroxychloride, aluminum sulfate, aluminum chloride, polyaluminum chloride, sodium aluminate/aluminum hydroxide); iron salts (e.g., ferric sulfate, ferric chloride); salts of calcium, zinc, and silicon; or mixtures of one or more of any of the foregoing.

Coagulant chemicals may include mixtures of organic coagulants and inorganic coagulants. For example, the above coagulant chemical(s) can be blended to yield products with greater clarification activity than the individual coagulant chemicals on their own. Mixtures of coagulant chemicals can range from 1:99 to 99:1 organic to inorganic components.

Coagulant chemicals may include one or more solvents, such as water, alcohol(s), or the like). A particularly effective coagulant chemical for some situations includes 65.5624 weight percent (wt %) water, 20.8290 wt % aluminum hydroxychloride, 8.6130 wt % calcium chloride, 3.7026 wt % dimethylamine-epichlorohydrin copolymer, 1.2650 wt % aluminum phosphate, 0.0210 wt % dimethylamine, 0.0024 wt % 3-chloro-1,2-propanediol, 0.0023 wt % 2,3-dichloropropyl alcohol, and 0.0023 wt % 1,3-dichloro-2-propanol.

Chemical components that are not strictly coagulants may be used as coagulant chemicals. For example, metal chelants, polymeric flocculants, oxidants, or the like may be used as or in coagulant chemicals. These chemical components may be added to the water or present in the coagulant chemicals. Metal chelants may include ethylenediaminetetraacetic acid ("EDTA") and monomeric dithiocarbamate ("DTC"), polymers that include chelating groups like ethylyne dichloride ("EDC")-ammonia and dithiocarbamate or acrylate-based polymers with pendent DTC groups.

Polymeric Flocculants may be cationic, anionic, or neutral in charge. Unlike organic coagulants that have very high charge densities, flocculants can have varying charges. Molecular weights of polymeric flocculants are extremely large and can range from 2 million to 30 million amu. Suitable polymeric flocculants may include products of free-radical polymerization of vinyl-based monomers which include one or more of acrylamide, methacrylamide, acrylic acid, methyacrylic acid, dialkylaminoethylacrylate (chloride quat), methacylamidopropyltrimethylammonium chloride, and 2-acrylamido-2-methyl-1-propane sulfonic acid.

Each of the above chemical components may be added to the coagulating chemicals in the coagulating chemical source 130 or water in the circulating in the high velocity pump 120 separately or with one or more other components. Each of the chemical components may include a corresponding component source. In some examples, one or more components may be combined in a single source.

The hydrocarbon component(s) source 140 may include a reservoir containing hydrocarbon components (described in detail below) therein. The hydrocarbon component(s) source 140 may include a tank, barrel, container, or other reservoir configured to hold hydrocarbon components therein. For example, the hydrocarbon component(s) source 140 may include a polymer tank of hydrocarbon components.

The hydrocarbon component(s) source 140 may be fluidly connected to the high velocity pump 120 via one or more of a conduit or pump (not shown) therebetween, such as a metering pump to control the rate or amount of coagulant chemicals added to the water and solids passing through the high velocity pump 120. A spool may be utilized between the high velocity pump and the hydrocarbon component(s) source 140 to aid in mixing the hydrocarbon component(s) with the water and solids therein.

The hydrocarbon components in the hydrocarbon component(s) source 140 may include one or more stabilized condensates (e.g., crude oil having volatile light hydrocarbons removed). Such stabilized condensates are readily available in the field and relatively inexpensive. The one or more stabilized condensates may include stabilized hydrocarbon condensates having at least 5 carbon atoms per molecule, such as an average carbon content of 5 carbon atoms to 500 carbon atoms, 5 carbon atoms to 20 carbon atoms, 10 carbon atoms to 100 carbon atoms, 100 carbon atoms to 300 carbon atoms, 300 carbon atoms to 500 carbon atoms, less than 500 carbon atoms, less than 200 carbon atoms, or an average carbon content of less than 100 carbon atoms per molecule. The average molecular weight of the stabilized condensate may be at least. The hydrocarbon components are formulated to bond to the coagulated solids in the water. The natural density of the hydrocarbon component(s), such as stabilized condensates, floats metals and other solids in water. Accordingly, air circulation is not needed to suspend solids particles in water.

The addition of coagulant chemicals (with or without additional chemical components) and hydrocarbon components to the water and solids in at the high velocity pump 120 may be carried out separately or in one or more groups. The set-up at the high velocity pump 120 may vary based on the number of coagulant chemicals and hydrocarbon components to be added to the water and solids. FIG. 1 depicts a simple system, where the coagulant chemicals are provided from a single coagulant chemical source 130 and the one or more hydrocarbon components are provided from a single hydrocarbon component source 140.

Figure 2:
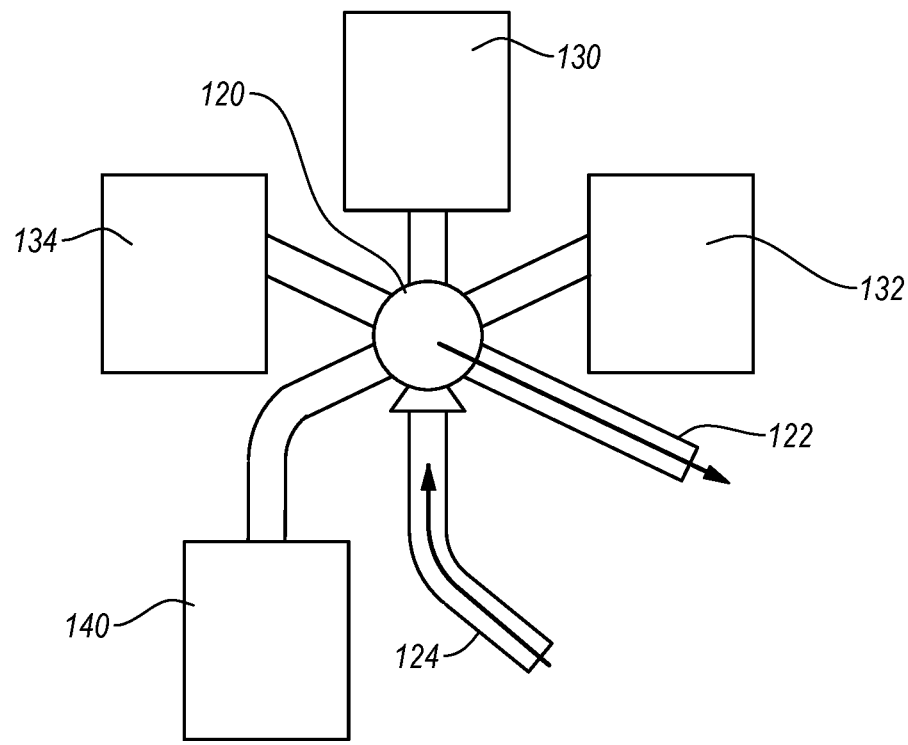
FIG. 2 is a block diagram of a high velocity pump with chemical component sources fluidly connected thereto separately, according to an embodiment

FIG. 2 is a block diagram of high velocity pump 120 with chemical component sources fluidly connected thereto separately, according to an embodiment. The high velocity pump 120 may be fluidly connected to the inlet 124, the outlet 122, the coagulant chemical source 130, the hydrocarbon component source 140, a first chemical component source 132, and a second chemical component source 134. The first and second chemical component sources 132 and 134 may be configured similarly or identically to the coagulant chemical source 130 in one or more aspects. The first and second chemical component sources 132 and 134 may be connected to the high velocity pump 120 similarly or identically to the coagulant chemical source 130 or the hydrocarbon component source 140, in one or more aspects.

The first and second chemical component sources 132 and 134 may store any of the chemical components disclosed herein. In such of the embodiments, each of the coagulant chemicals, hydrocarbon components, and additional chemical components may be added to the water and solids at the high velocity pump 120 separately.

Figure 3:
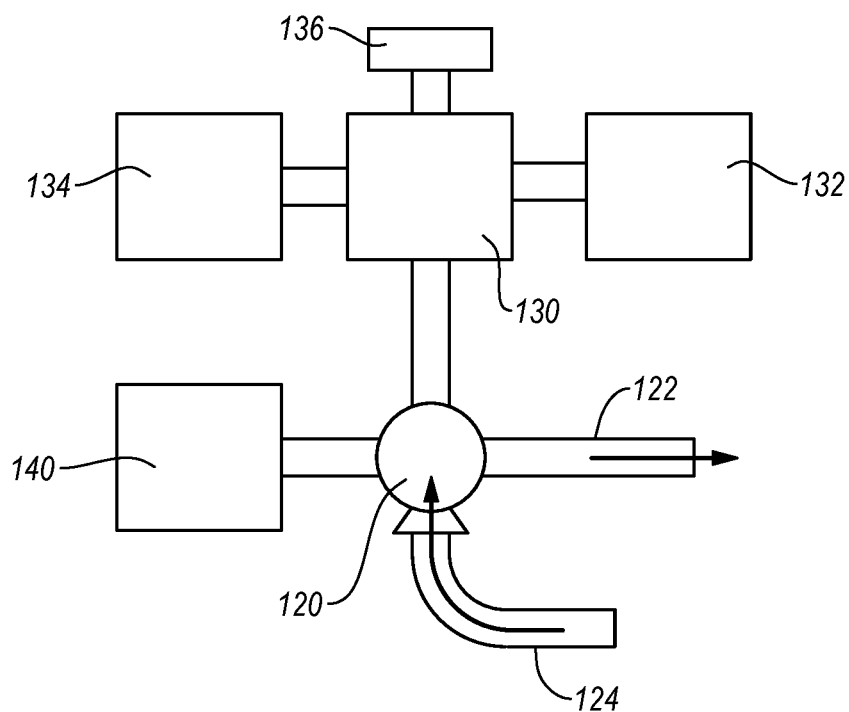
FIG. 3 is a block diagram of a high velocity pump with chemical component sources fluidly connected thereto via the coagulant chemical source, according to an embodiment.

FIG. 3 is a block diagram of high velocity pump 120 with chemical component sources fluidly connected thereto via the coagulant chemical source 130, according to an embodiment. The high velocity pump 120 may be fluidly connected directly to the inlet 124, the outlet 122, the coagulant chemical source 130, the hydrocarbon component source 140. The first chemical component source 132, the second chemical component source 134 and a third chemical component source 136 may be directly connected to the coagulant chemical source 130. The first, second, and third chemical component sources 132, 134, and 136 may be configured similarly or identically to the coagulant chemical source 130 in one or more aspects. The first, second, and third chemical component sources 132, 134, and 136 may be connected to the coagulant chemical source 130 similarly or identically to how the coagulant chemical source 130 is coupled to the high velocity pump 120, in one or more aspects, such as via one or more conduits and one or more metering pumps therebetween.

The first, second, and third chemical component sources 132, 134, and 136 may store any of the chemical components disclosed herein. In such of the embodiments, each of the additional chemical components in the first, second, and third chemical component sources 132, 134, and 136 may be added to the coagulant chemical source 130 prior to mixing with the water and solids at the high velocity pump 120.

Any number of high velocity pumps 120 may be utilized, such as 1 to 100 high velocity pumps 120, 1 to 5 high velocity pumps, 2 to 10 high velocity pumps, 10 to 20 high velocity pumps, 20 to 50 high velocity pumps, less than 20 high velocity pumps or less than 10 high velocity pumps. For example and as shown in FIG. 1, multiple high velocity pumps 120 may be utilized. Such configurations may be utilized to temporarily suspend solids in the water prior to coagulation and floating the solids to the surface as part of the slurry of suspended solids. Some or all of the high velocity pumps 120 be coupled to sources of coagulant chemical(s), hydrocarbon component(s), and additional chemical components if present.

Any number of coagulant chemical sources, hydrocarbon component sources, and additional chemical components sources may be coupled to the at least one high velocity pump 120 (directly, indirectly, or combinations thereof) to mix any number of coagulant chemicals, hydrocarbon components, and additional chemical components with the water and solids at the high velocity pump 120.

Returning to FIG. 1, the system 100 may include one or more collection apparatuses 150 fluidly connected to the water reservoir 110. The one or more collection apparatuses 150 may include one or more of at least one skimmer 152, at least one boom 156, at least one filter (not shown), or the like. The one or more collection apparatuses 150 may be disposed in the upper surface region of the water reservoir 110 to collect the slurry of suspended solids located therein.

The at least one skimmer 152 may include any water skimmer or oil skimmer, such as a pond skimmer, an oil skimmer, Weir Skimmer, or the like. The skimmer or inlet thereof may be suspended or otherwise positioned on the water by a boom above the water in the water reservoir 110 or by floats on the surface of the water in the water reservoir 110. For example, the at least one skimmer may include a Sea Skater skimmer (from ELASTEC of Carmi, Illinois, USA). Weir skimmers are particularly suitable for the techniques and systems disclosed herein because the weir may automatically adjust skimming depth according to the pump rate (e.g., slow down the suction pump and the weir will take a smaller cut of the surface). The inlet of the at least one skimmer may be positioned and configured to remove the slurry of solids and water to a selected depth within the water reservoir 110. The at least one skimmer 152 may be connected to a vacuum source, such as a suction pump, vacuum truck, or the like via a hose or conduit to remove the slurry of suspended solids floating in the upper surface region of the water reservoir 110.

The at least one boom 156 may include a containment boom. The at least one boom 156 may be a foam filled containment boom or an inflatable containment boom. The at least one boom 156 may include a curtain extending a selected distance into the water of the water reservoir 110. The at least one boom 156 may be utilized to contain the slurry of suspended solids to an area that is less than a total surface area of the water reservoir 110. In some examples, multiple booms may be utilized to ensure as much of the slurry of suspended solids is contained as possible. The area of the upper surface region within the at least one boom 156 may be cleared of the slurry of suspended solids by at least one skimmer 152 disposed thereon. In some examples, the at least one boom 156 may be omitted.

The one or more collection apparatuses may be positioned at one or more points on the surface of the water reservoir (e.g., on the surface water of in the water reservoir) or in a upper surface region of the water reservoir (e.g., on the surface and into the water reservoir a selected distance effective to include the slurry of suspended solids below but near the surface of the water in the water reservoir 110).

The slurry of solids may be deposited in suspended solids storage tank 165, such as in a tank, storage container, or vessel. For example, a vacuum truck may be operably coupled to the at least one skimmer 152 via a hose and the slurry of suspended solids may be deposited in a collection tank of the vacuum truck or one or more storage tanks operably coupled thereto.

The water in the slurry of solids may be separated from one or more of the solids, coagulating chemicals, or hydrocarbon components therein. One or more separation apparatuses or systems may be utilized to separate of water from the one or more of the solids, coagulating chemicals, or hydrocarbon components therein. The separation apparatus can be as simple as a separate holding tank to allow the waters in the slurry to separate from the suspended solids. The separated water can be further processes or sent back to the water reservoir if the water is clean enough to meet predetermined criteria, such as clarity or content standards.

The system 100 may be utilized to clean water, such as by removing one or more solids from the water. Such techniques are particularly useful for produced water with metal and other solids content.

Figure 4:
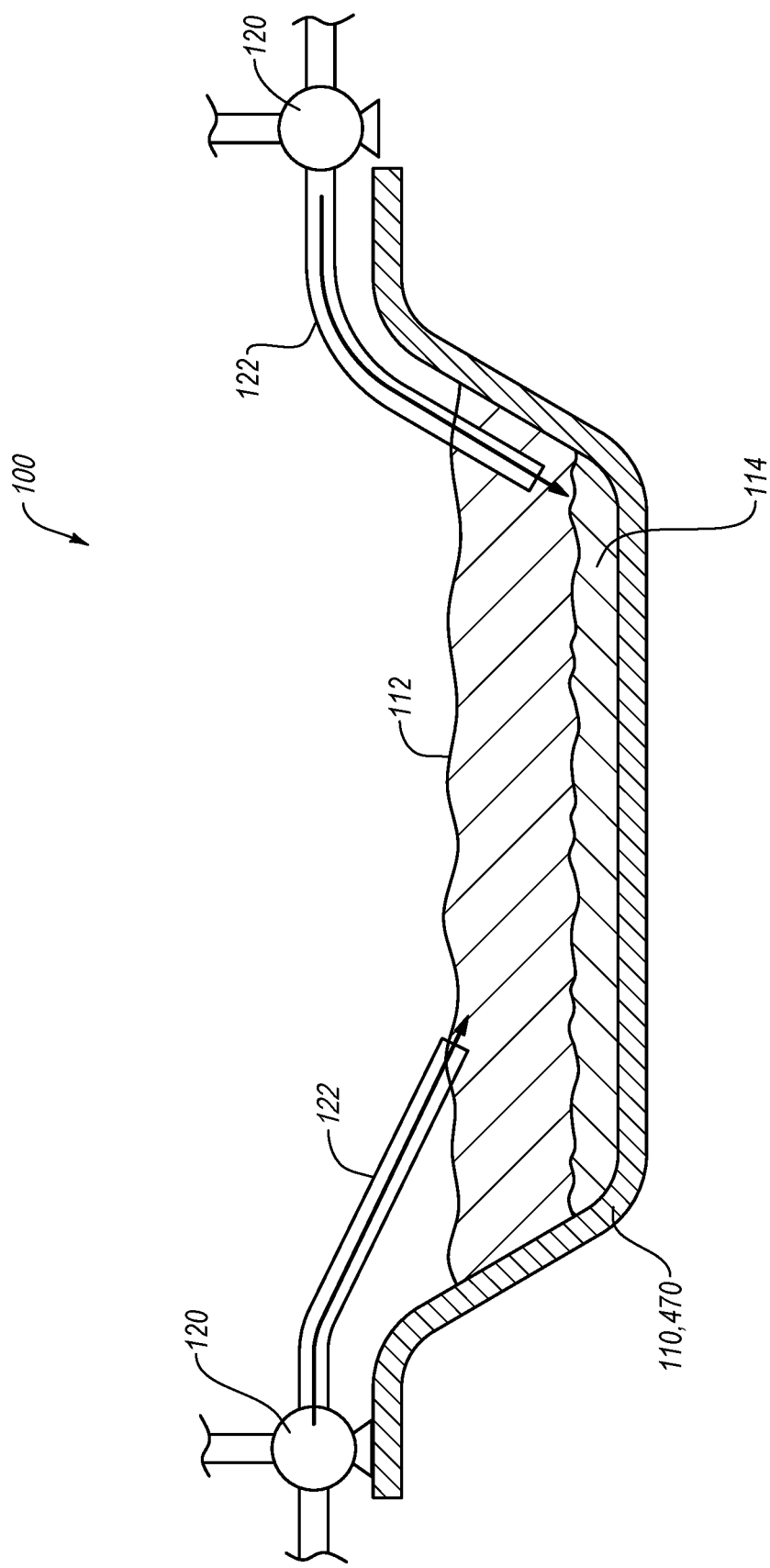
FIGS. 4-6 are cross-sectional views of the system at various points of a method of cleaning water, according to an embodiment.
Figure 5:
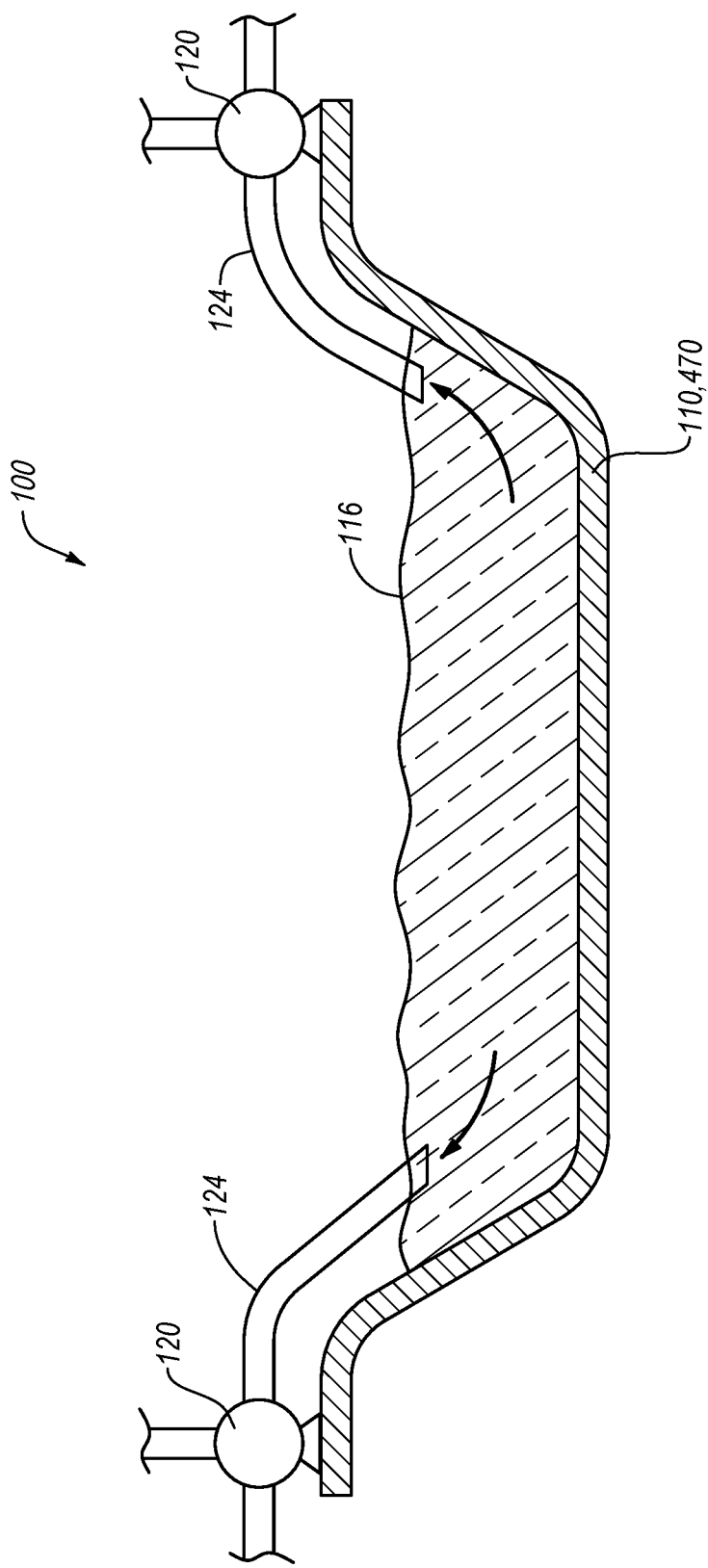
Figure 6:
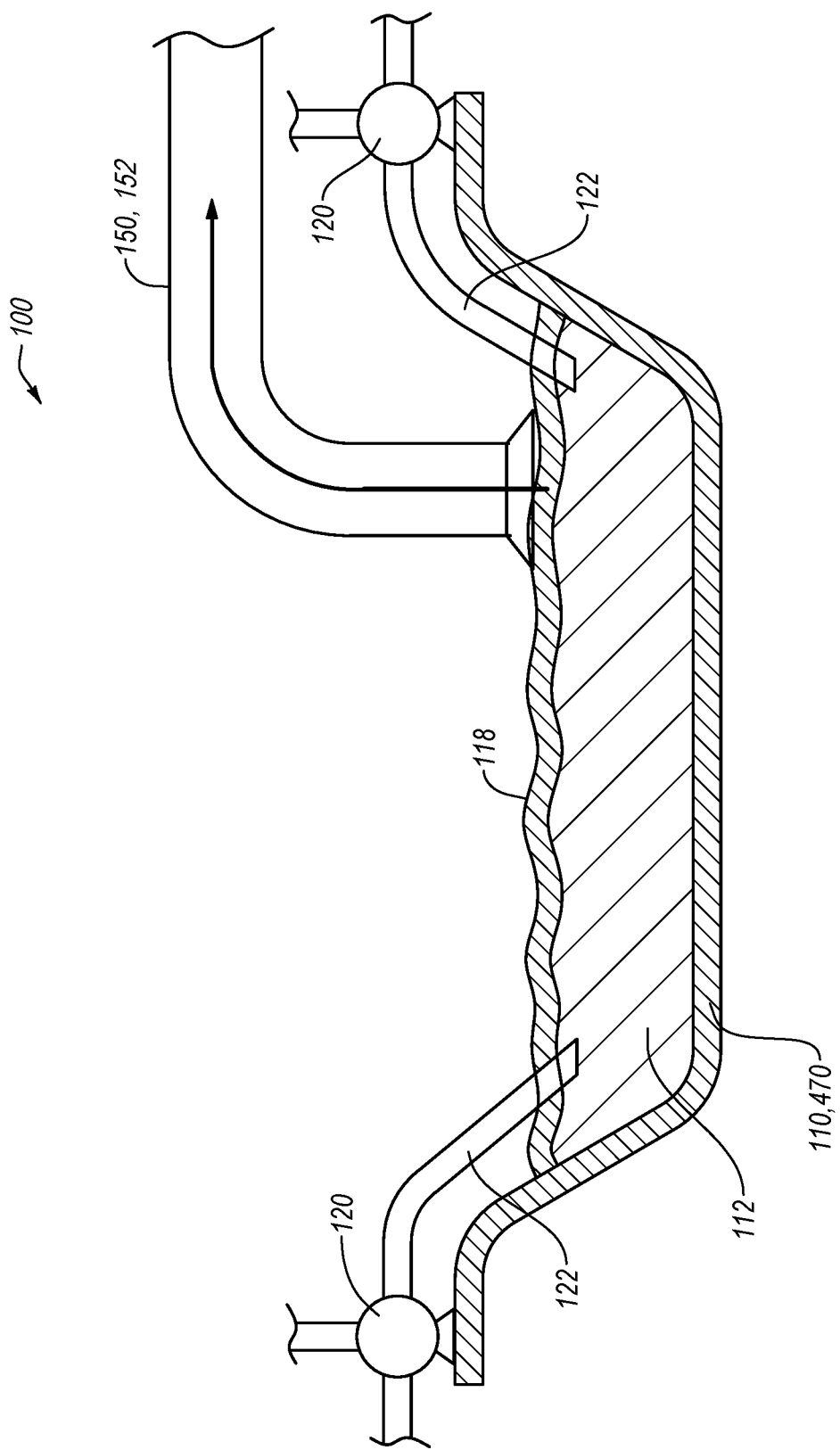
Figure 7:
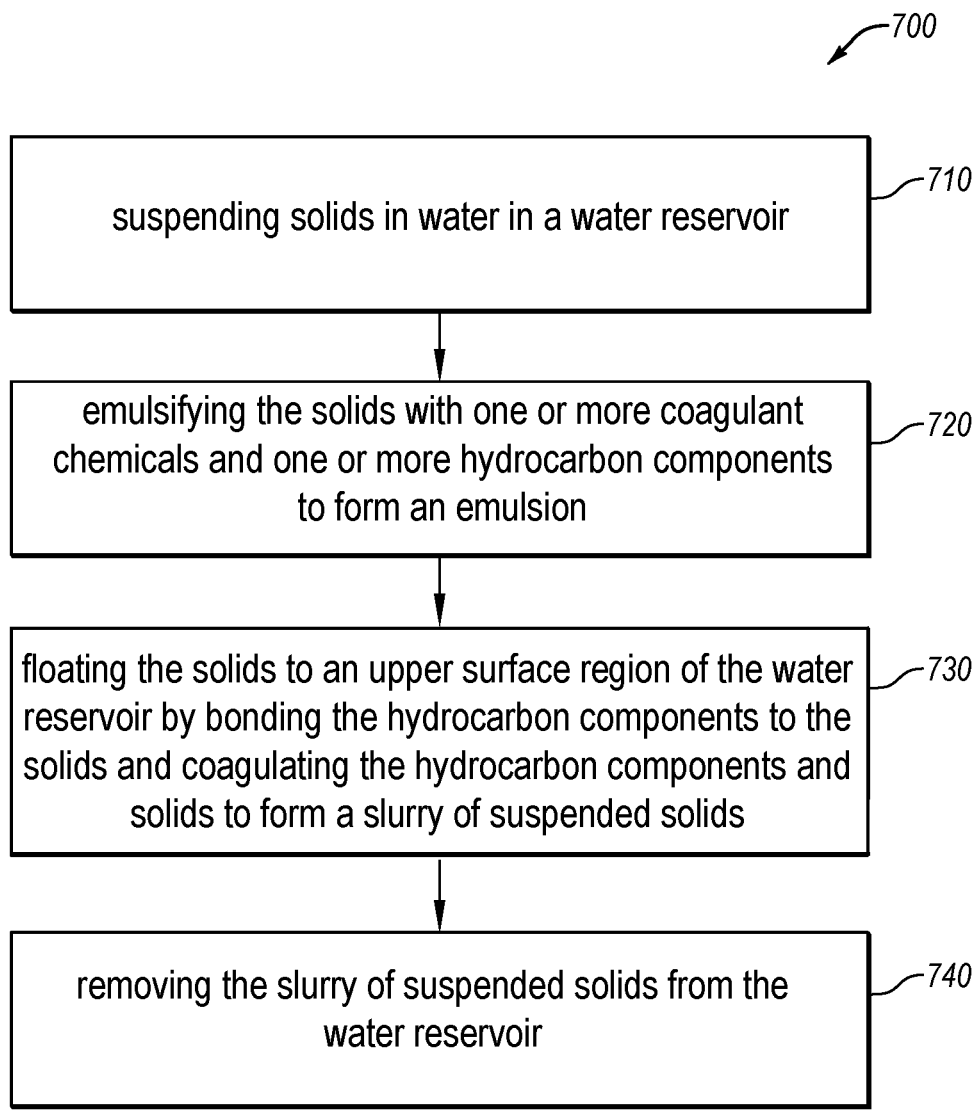
FIG. 7 is a flow chart of a method of cleaning water, according to an embodiment.

FIGS. 4-6 are cross-sectional views of the system 100 at various points of a method of cleaning water, according to an embodiment. FIG. 7 is a flow chart of a method of cleaning water, according to an embodiment. The method 700 includes a first block 710 of suspending solids in water in a water reservoir, a second block 720 of emulsifying the solids with one or more coagulant chemicals and one or more hydrocarbon components to form an emulsion; a third block 730 of floating the solids to an upper surface region of the water reservoir by bonding the hydrocarbon components to the solids and coagulating the hydrocarbon components and solids to form a slurry of suspended solids; and a fourth block 740 of removing the slurry of suspended solids from the water reservoir. In some embodiments, one or more of the blocks 710-740 may be omitted, combined, split, or performed in a different order than presented in FIG. 7. For example, the block 740 may be omitted in some embodiments. Additional blocks may be added to the method 700 in some embodiments.

The first block 710 of suspending solids in water in a water reservoir may include agitating the solids in the water reservoir. Suspending the solids includes temporarily suspending the solids in the water. As shown in FIG. 4, the solids 114 may be present in the water 112 within the water reservoir 110 as sludge, precipitate, or other settled material in the lower region thereof, such as on the liner 470 of the water reservoir 110. Suspending solids in water in a water reservoir may include agitating the solids 114 in the water reservoir 110 using one or more of liquid agitation, mechanical agitation, or air agitation. For example, suspending solids in water in a water reservoir may include inputting liquid from at least one high velocity pump 120 into the water reservoir at a rate or pressure effective to agitate the solids from a lower region (e.g., bottom) of the water reservoir and temporarily suspend the solids in the water. The outlet 122 of at least one of the high velocity pumps 120 may be directed toward the solids 114.

The outlet 122 of at least one of the high velocity pumps 120 may be directed in a direction selected to provide water flow in the water 112, such as to move the water in a selected pattern (e.g., rotate the water in the water reservoir or one or more discrete regions of the water reservoir). The agitation may provide kinetic energy to the water 112, thereby sweeping up and temporarily suspending the solids 114 as the water 112 is moved in the water reservoir 110.

As shown in FIG. 5, the inlets 124 of at least one of the high velocity pumps 120 may be directed in a direction selected to provide water flow in the water of the water reservoir 110, such as to move the water in a selected pattern within the water reservoir 110. The liquid flow through the outlets 122 and inlets 124 of the high velocity pumps 120 may work together to provide movement of the water in the water reservoir 110 to agitate the solids 114 therein.

Any arrangement of outlets 122 and inlets 124 may be utilized to selectively control agitation of the solids 114 in the water 112. For example, one or both of the outlet 122 and inlets 124 may be disposed at or near the surface of the water in the water reservoir 110, such as by suspension with one or more floats. One or both of the outlet 122 and inlets 124 may be disposed at or near the bottom of the water in the water reservoir 110, such as by weighting with one or more weights. One or both of the outlet 122 and inlets 124 may be disposed at one or more intermediate points between the surface and the bottom of the water in the water reservoir 110, such as by weighting with one or more weights and/or floating with one or more floats.

In some examples, mechanical agitation may include stirrers. In some examples, agitation may include injecting air into the water. The latter approach is expensive and less effective at suspending the solids than liquid agitation.

Suspending solids in water in a water reservoir may include agitating the solids continuously, such as for at least the time it takes to flow the entire volume of water in the water reservoir 110 through the at least one high velocity pump 120. For example agitating may last for at least 2 hours, at least 6 hours, 6 hours to 12 hours, 12 hours to 24 hours, more than 24 hours, less than 24 hours, or less than 12 hours.

Returning to FIG. 7, the second block 720 of emulsifying the solids with one or more coagulant chemicals and one or more hydrocarbon components to form an emulsion may include emulsifying any of the coagulant chemicals and hydrocarbon components disclosed herein with the water and suspended solids. For example, the one or more coagulant chemicals may include organic coagulant chemicals, inorganic chemicals, or combinations of any of the foregoing. The one or more coagulant chemicals may include at least one of one or more polyamines; one or more polyquaternary amine halides; one or more dithiocarbamates; one or more tannins; poly(diallyldimethyl) ammonium chloride; co or terpolymers of diallyldimethylammonium chloride with one or more of acrylamide, methacrylamide, acrylic acid, methyacrylic acid, dialkylaminoethylacrylate, methacylamidopropyltrimethylammonium chloride and 2-Acrylamido-2-methyl-1-propane sulfonic acid; one or more condensation polymers of dimethylamine/epichlorohydrin; one or more triethanolamine quaternary polymers; one or more ethylene dichloride/ammonia polymers; one or more aluminum salts (e.g., poly aluminum; one or more iron salts; one or more salts of at least one of calcium, zinc, and silicon; or mixtures of one or more of any of the foregoing.

The one or more hydrocarbon components may include at least one stabilized condensate having hydrocarbons with an average carbon content of at least 5 carbon atoms, such as any of the average carbon contents disclosed herein.

Emulsifying the solids with one or more coagulant chemicals and one or more hydrocarbon components to form an emulsion may include circulating the water, solids, one or more coagulant chemicals, and one or more hydrocarbon components through at least one high velocity pump to provide an effective amount of shear force to form the emulsion of the water, solids, one or more coagulant chemicals, and one or more hydrocarbon components. The emulsion may be a substantially uniform emulsion within one or more of the high velocity pump or the outlet of the high velocity pump.

Circulating the water, solids, one or more coagulant chemicals, and one or more hydrocarbon components through at least one high velocity pump to provide an effective amount of shear force to form the emulsion of the water, solids, one or more coagulant chemicals, and one or more hydrocarbon components may be carried out using any of the high velocity pumps disclosed herein, at any of the rates disclosed herein, for any of the durations or times disclosed herein, or combinations of any of the foregoing.

Circulating the water, solids, one or more coagulant chemicals, and one or more hydrocarbon components through at least one high velocity pump may include circulating the water, solids, one or more coagulant chemicals, and one or more hydrocarbon components through a plurality of high velocity pumps. Circulating the water, solids, one or more coagulant chemicals, and one or more hydrocarbon components through at least one high velocity pump may include intaking the water and solids into the one or more high velocity pumps via the intake thereof and outputting the emulsion through the outlet thereof.

Emulsifying the water and solids with one or more coagulant chemicals and one or more hydrocarbon components to form an emulsion may include adding the one or more coagulant chemicals (with or without additional chemical components) and one or more hydrocarbon components to the water and solids at the at least one high velocity pump. For example, the method 700 may include emulsifying one or metal chelants, one or more polymeric flocculants, one or more oxidants, or mixtures of any of the foregoing with the water, solids, one or more coagulant chemicals, and one or more hydrocarbon components. The one or more coagulant chemicals and one or more hydrocarbon components may be metered into the water and solids via a pump and conduit between the at least one high velocity pump and coagulant chemical source and hydrocarbon component source.

The water, solids, coagulant chemical(s), and hydrocarbon component(s) are mixed to form the emulsion in the water of the water reservoir using high shear force in the high velocity pump. The above components may be introduced into the system for cleaning water and at least partially mixed prior to or during circulating through the high velocity pump which provides sufficient shear forces to form an emulsion. For example, a suction inlet of a high velocity pump may be disposed in a water storage reservoir (e.g., pond) where water is pulled into the high velocity pump and the emulsion may be formed by adding the hydrocarbon component into the system through a mixing spool operably coupled to the inlet such as prior to or contemporaneously with entering the high velocity pump. The coagulant chemical(s) may be input into the system via a separate input line than the hydrocarbon component(s), but at essentially the same input point as the hydrocarbon component(s). Accordingly, as the water containing the solids (e.g., emulsifying agent(s)), the hydrocarbon component(s), and the coagulant chemical(s) are circulated through the high velocity pump, the components form an emulsion aided by the high shear forces applied by the high velocity pump. The one or more coagulant chemicals and one or more hydrocarbon components may be added at selected rates. For example, the coagulant chemical(s) may be added at a rate of 100 ppm to 600 ppm and the hydrocarbon component(s) may be added at a rate of 500 ppm to 2500 ppm, such as at a rate of 300 ppm of coagulant chemicals and 1500 ppm of hydrocarbon components (e.g., stabilized condensate).

In some embodiments, the one or more coagulant chemicals may include 65.5624% weight percent (wt %) water, 20.8290 wt % aluminum hydroxychloride, 8.6130 wt % calcium chloride, 3.7026 wt % dimethylamine-epichlorohydrin copolymer, 1.2650 wt % aluminum phosphate, 0.0210 wt % dimethylamine, 0.0024 wt % 3-chloro-1,2-propanediol, 0.0023 wt % 2,3-dichloropropyl alcohol, and 0.0023 wt % 1,3-dichloro-2-propanol. The proportions of the various coagulant chemicals may vary from the above example. For example, the solvent may be at least 50 wt % of the one or more coagulant chemicals (e.g., a mixture of one or more coagulant chemicals).

As shown in FIG. 5, the suspension 116 of water and suspended solids may be pulled into the at least one high velocity pump 120 via the inlet 124 (as opposed to the outlet 122 illustrated in FIGS. 4 and 6), after or during agitation of the solids. The suspension 116 is then emulsified with the hydrocarbon component(s) and the coagulant chemical(s).

After agitation, the settled solids 114 (FIG. 4) may be temporarily suspended in the water to form the suspension 116.

Emulsifying the water and solids with one or more coagulant chemicals and one or more hydrocarbon components to form an emulsion may include emulsifying the water, solids, one or more coagulant chemicals, and one or more hydrocarbon components continuously, such as for at least the time it takes to flow the entire volume of water in the water reservoir 110 through the at least one high velocity pump 120. For example, emulsifying may last for at least 2 hours, at least 6 hours, 6 hours to 12 hours, 12 hours to 24 hours, more than 24 hours, less than 24 hours, or less than 12 hours.

During use, coagulant chemical(s) and hydrocarbon component(s) are combined in the water (e.g., waste water pond) and solids therein, with mechanical shear forces provided by the high velocity pump to join all of the components together in a substantially uniform emulsion.

Returning to FIG. 5, the third block 730 of floating the solids to an upper surface region of the water reservoir by bonding the hydrocarbon components to the solids and coagulating the hydrocarbon components and solids to form a slurry of suspended solids may include resting the emulsion of water, solids, one or more coagulant chemicals, and one or more hydrocarbon components in the water reservoir. For example, floating the solids to the top of the water reservoir by bonding the hydrocarbon components to the solids and coagulating the hydrocarbon components and solids may include terminating one or more of the suspending or emulsifying acts in blocks 710 and 720 for a time sufficient to allow the hydrocarbon components bonded to the solids to form the slurry of suspended solids. The time may be at least 1 hour, such as 1 hour to 48 hours, 2 hours to 24 hours, 4 hours to 16 hours, 8 hours to 12 hours, 10 hours to 24 hours, less than 48 hours, or less than 12 hours. The slurry of suspended solids may include water, the solids, one or more coagulant chemicals (with or without the one or more additional chemical components such as chelants, flocculants, or the like), and one or more hydrocarbon components.

Floating the solids to an upper surface region of the water reservoir may include floating the slurry of suspended solids to the upper 10% of the water reservoir. During use, such as after emulsion, the coagulant chemical(s) coagulate the solids into a larger mass and the hydrocarbon components at least partially coat the solids (coagulated solids or otherwise) in the water. The hydrocarbon components (e.g., stabilized condensate) cause the solids and coagulant chemical(s) to float in the water.

As shown in FIG. 6, the slurry of suspended solids 118 in the water reservoir 110 may float to and be located in the upper surface region of the water reservoir 110. The upper surface region may extend into the water in the water reservoir a depth of 10% of the total depth of the water, or less. The solids can be collected via the at least one collection apparatus as a slurry of suspended solids and further processes to isolate the components therein.

Returning to FIG. 7, the fourth block 740 of removing the slurry of suspended solids from the water reservoir may include skimming, vacuuming, filtering, or otherwise moving the slurry of suspended solids out of the water reservoir. Removing the slurry of suspended solids from the water reservoir may include using any of the collection apparatuses disclosed herein. For example, removing the slurry of suspended solids may include using at least one boom on the upper surface region of the water reservoir to gather the slurry of suspended solids into an area smaller than the entire upper surface of the water reservoir. Removing the slurry of suspended solids may include using at least one skimmer to remove the slurry of suspended solids, such as any of the skimmers disclosed herein. The skimmer may be operably coupled to a vacuum source to remove the slurry of suspended solids from the skimmer.

As shown in FIG. 6, the skimmer 152 may be disposed in the upper surface region of the water reservoir and extend a distance therein, such as to a depth from the upper surface of 10 percent of the total depth of the water in water reservoir or less than 10 percent of the total depth. The skimmer may remove substantially all of the slurry of suspended solids to a selected depth in the water reservoir. Suction force may be exerted on the slurry of suspended solids through the skimmer by a fluid connection to a vacuum source such as a vacuum truck. The suction may allow the skimmer to remove the slurry of suspended solids to a greater depth within the water reservoir than the skimmer physically extends to.

The method 700 may include separating the solids from water in the slurry of suspended solids, such as with one or more of a separation apparatus or one or more solvents or reactants composed to separate water from the solids, one or more coagulant chemicals, and hydrocarbon components.

The method 700 may include using the substantially clean water (e.g., water from which the slurry of suspended solids has been removed) in the water reservoir, such as for drilling, fracking, cooling, lubrication, or any other application.

The methods and systems disclosed herein create an emulsion with shear force using a combination of high velocity pumps, coagulant chemicals, and hydrocarbon components to lift and float solids in a stabilized floating mass for removal from the water by mechanical means, such as skimming. The technique and systems disclosed herein do not require air circulation to float the resulting coagulated solids and hydrocarbon material. The technique and systems disclosed herein have been used to emulsify 60,000 cubic meters of water and solids with the hydrocarbon component (s), and the coagulant chemical(s) in 12 hours. In addition to initial slurry formation during emulsion, a further 12 hour to 24 hour rest of the water reservoir (e.g., without operating the at least one high velocity pump) provided a slurry of suspended solids.

As noted herein, the techniques and system disclosed herein we used to remove about 2 million pounds of a slurry of suspended solids from a 60,000 gallon produced water reservoir which yielded more than 500,000 pounds of solids when separated from the solids slurry. Approximately 1% to 1.5% (by weight) of the components in the water reservoir may be removed as the slurry of suspended solids. Water in the water reservoir had a greatly improved clarity and could be used for fracking, drilling, or other industrial processes after removal of the solids.

Many techniques were utilized and failed to provide the economic and simple separation of the solids provided by the techniques disclosed above. For example, lamella plate separation, precipitation, filtration all failed to provide the results disclosed herein. Additionally, many chemicals failed to float the solids. The combination of hydrocarbon components and coagulants disclosed herein provided surprising results. The results were surprising because it is counterintuitive to use hydrocarbons to clean water with entrained hydrocarbons in the water. Prior to this solution, traditional thought and process was to remove all hydrocarbon from produced water without the addition of more hydrocarbons. However, with the buoyancy of the hydrocarbon components and the removal of solids, water quality exceeded expectations. After skimming, the hydrocarbons that were added to the water were successfully removed from the reservoir based on the coagulation of the added hydrocarbons into the slurry of suspended solids.

During testing of the systems and methods disclosed herein it was discovered that the material in the lining of the tank can alter the coagulant chemical effectiveness. Many chemical coagulants failed when plastic liners were utilized in the water reservoirs. However, when the techniques disclosed above were utilized, the solids floated to the top of the water reservoir and were removed with booms and skimming. Various produced water was tested. In one field test over 2 million pounds of slurry of suspended solids was removed for disposal with excellent residual water quality. From this test, over 500,000 thousand pounds of solids were removed from the recovered slurry of suspended slurry.

Without being bound to a specific theory, the inventors believe the water clarification provided by the systems and methods herein include two basic processes, coagulation and flocculation. It is believed, the coagulation acts on solids particles suspended particles in the water to be treated by neutralizing the net charge on the external surface of the solids. The net surface charge is typically negative, and dispersed across the surface of the solids, which keeps the solids dispersed in the water. By neutralizing that charge, with what is typically a cationic coagulant chemical, the solids can be begin to coagulate with each other in pin floc formation.

Flocculation uses long chain polymers with anionic functional groups which will attach to the pin floc (e.g., solids) formed in coagulation, to create a larger particle that can settle more quickly or be floated with appropriate mechanical aid. The disclosure herein utilizes stabilized condensates (e.g., hydrocarbons) natural buoyancy to lift the solids once shear force has bonded the solids, one or more coagulant chemicals and one or more hydrocarbon components together.

The one or more coagulant chemicals disclosed herein effectively neutralize the effect of the charge on the polymer liner or material of the water reservoir. Accordingly, the coagulation and flocculation can proceed without interference from the plastic liner or material of the water reservoir.

As used herein, the term "about" or "substantially" refers to an allowable variance of the term modified by "about" by ±10% or ±5%. Further, the terms "less than," "or less," "greater than", "more than," or "or more" include as an endpoint, the value that is modified by the terms "less than," "or less," "greater than," "more than," or "or more."

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of cleaning water, the method comprising:
   suspending solids in water in a water reservoir;
   emulsifying the solids with one or more coagulant chemicals and one or more hydrocarbon components to form an emulsion, the one or more hydrocarbon components including at least one stabilized condensate; and floating the solids to an upper surface region of the water reservoir by bonding the one or more hydrocarbon components to the solids and coagulating the one or more hydrocarbon components and the solids to form a slurry of suspended solids.

2. The method of claim 1 wherein suspending the solids in the water in the water reservoir includes agitating the solids in the water reservoir using one or more of liquid agitation or mechanical agitation.

3. The method of claim 1 wherein emulsifying the solids with the one or more coagulant chemicals and the one or more hydrocarbon components to form the emulsion includes circulating the water, one or more coagulant chemicals, and one or more hydrocarbon components through at least one high velocity pump to provide an effective amount of shear force to form the emulsion of the water, solids, one or more coagulant chemicals, and one or more hydrocarbon components.

4. The method of claim 1 wherein floating the solids to the top of the water reservoir by bonding the one or more hydrocarbon components to the solids and coagulating the one or more hydrocarbon components and the solids includes terminating the emulsifying for a time sufficient to allow the one or more hydrocarbon components bonded to the solids to form the slurry of suspended solids.

5. The method of claim 4 wherein the time is between 2 hours and 24 hours.

6. The method of claim 1 wherein the one or more coagulant chemicals include at least one of:
   one or more polyamines;
   one or more polyquaternary amine halides;
   one or more dithiocarbamates;
   one or more tannins;
   poly (diallyldimethyl) ammonium chloride;
   one or more copolymers and/or one or more terpolymers of diallyldimethylammonium chloride with one or more of acrylamide, methacrylamide, acrylic acid, methyacrylic acid, dialkylaminoethylacrylate, methacylamidopropyltrimethylammonium chloride and 2-Acrylamido-2-methyl-1-propane sulfonic acid;
   one or more dimethylamine-epichlorohydrin copolymer,
   one or more triethanolamine quaternary polymers;
   one or more ethyleneamine polymers formed by reacting ethylene dichloride with ammonia;
   one or more aluminum salts;
   one or more iron salts;
   one or more salts of at least one of calcium, zinc, and silicon; or
   mixtures of two or more of any of the foregoing.

7. The method of claim 1, further comprising removing the slurry of suspended solids from the water reservoir using:
   at least one boom on an upper surface region of the water reservoir to gather the slurry of suspended solids into an area smaller than an entire upper surface of the water reservoir; and
   at least one skimmer to remove the slurry of suspended solids.

8. The method of claim 7, further comprising separating the solids from water in the slurry of suspended solids.

9. A system for cleaning water, the system comprising:
   a water reservoir;
   at least one high velocity pump fluidly connected to the water reservoir, the at least one high velocity pump having a rate of fluid therethrough of at least 100 gallons per minute;
   a coagulant chemical source fluidly connected to the high velocity pump;
   a hydrocarbon component source fluidly connected to the at least one high velocity pump, the hydrocarbon component source including a reservoir of one or more hydrocarbon components. the one or more hydrocarbon components including at least one stabilized condensate; and
   one or more collection apparatuses fluidly connected to the water reservoir.

10. The system of claim 9 wherein the water reservoir includes a holding pond containing produced water.

11. The system of claim 9 wherein the at least one high velocity pump includes one or more of a mass transfer pump, a rotary pump, or a turbine pump.

12. The system of claim 9 wherein the coagulant chemical source includes a reservoir of the one or more coagulant chemicals, the one or more coagulant chemicals including a solvent and at least one of:
   one or more polyamines;
   one or more polyquaternary amine halides;
   one or more dithiocarbamates;
   one or more tannins;
   poly (diallyldimethyl) ammonium chloride;
   one or more copolymers and/or one or more terpolymers of diallyldimethylammonium chloride with one or more of acrylamide, methacrylamide, acrylic acid, methyacrylic acid, dialkylaminoethylacrylate, methacylamidopropyltrimethylammonium chloride and 2-Acrylamido-2-methyl-1-propane sulfonic acid;
   one or more dimethylamine-epichlorohydrin copolymer,
   one or more triethanolamine quaternary polymers;
   one or more ethyleneamine polymers formed by reacting ethylene dichloride with ammonia;
   one or more aluminum salts;
   one or more iron salts;
   one or more salts of at least one of calcium, zinc, and silicon; or
   mixtures of one or more of any of the foregoing.

13. The system of claim 9 wherein the one or more collection apparatuses includes at least one skimmer configured to remove a slurry of suspended solids from a surface region of the water reservoir.

14. The system of claim 13 wherein the at least one skimmer is operably coupled to a vacuum source.

15. The system of claim 13 wherein the one or more collection apparatuses include a boom configured to gather the slurry of suspended solids on the surface region of the water reservoir.

16. The system of claim 9 further comprising a solids separation system configured to separate solids from water, the solids separation system in fluid communication with at least the water reservoir.

17. A method of cleaning produced water, the method comprising:
   agitating water in a water reservoir to suspend solids therein;
   forming an emulsion by circulating one or more coagulant chemicals, one or more hydrocarbon components, the water, and the solids through at least one high velocity pump, the one or more hydrocarbon components including at least one stabilized condensate;
   floating the solids, one or more hydrocarbon components, and one or more coagulant chemicals in the water reservoir as a slurry of suspended solids; and
   removing the slurry of suspended solids from the water reservoir.

18. The method of claim 17 wherein:

the one or more coagulant chemicals include 65.5624% weight percent (wt %) water, 20.8290 wt % aluminum hydroxychloride, 8.6130 wt % calcium chloride, 3.7026 wt % dimethylamine-epichlorohydrin copolymer, 1.2650 wt % aluminum phosphate, 0.0210 wt % dimethylamine, 0.0024 wt % 3-chloro-1,2-propanediol, 0.0023 wt % 2,3-dichloropropyl alcohol, 0.0023 wt % 1,3-dichloro-2-propanol.

\* \* \* \* \*